United States Patent
Tod et al.

(10) Patent No.: US 10,701,622 B2
(45) Date of Patent: Jun. 30, 2020

(54) SYSTEMS AND METHODS FOR WIFI MAPPING IN AN INDUSTRIAL FACILITY

(71) Applicant: Clearpath Robotics Inc., Kitchener (CA)

(72) Inventors: Anthony William Tod, St. Agatha (CA); Ryan Christopher Gariepy, Kitchener (CA); Ivor Wanders, Kitchener (CA); Andrew Clifford Blakey, Kitchener (CA)

(73) Assignee: CLEARPATH ROBOTICS INC., Kitchener (CA)

(*) Notice: Subject to any disclaimer, the term of this patent is extended or adjusted under 35 U.S.C. 154(b) by 15 days.

(21) Appl. No.: 16/018,211

(22) Filed: Jun. 26, 2018

(65) Prior Publication Data

US 2019/0253957 A1    Aug. 15, 2019

Related U.S. Application Data

(60) Provisional application No. 62/525,161, filed on Jun. 26, 2017.

(51) Int. Cl.
| | |
|---|---|
| *H04W 48/16* | (2009.01) |
| *H04W 4/33* | (2018.01) |
| *G01S 13/87* | (2006.01) |
| *H04W 64/00* | (2009.01) |
| *G01S 5/02* | (2010.01) |
| *H04W 24/08* | (2009.01) |
| *H04W 84/12* | (2009.01) |

(52) U.S. Cl.
CPC ........... *H04W 48/16* (2013.01); *G01S 5/0226* (2013.01); *G01S 5/0252* (2013.01); *G01S 13/878* (2013.01); *H04W 4/33* (2018.02); *H04W 64/003* (2013.01); *H04W 24/08* (2013.01); *H04W 84/12* (2013.01)

(58) Field of Classification Search
CPC ................................ H04W 48/16; H04W 4/33
See application file for complete search history.

(56) References Cited

U.S. PATENT DOCUMENTS

| | | | | |
|---|---|---|---|---|
| 2014/0087755 | A1* | 3/2014 | Schunk | G01S 5/0252 455/456.1 |
| 2015/0133167 | A1* | 5/2015 | Edge | H04W 4/043 455/456.3 |
| 2018/0049077 | A1* | 2/2018 | Mestanov | H04W 8/02 |
| 2018/0299883 | A1* | 10/2018 | Terzian | G09F 27/00 |

\* cited by examiner

*Primary Examiner* — Zhensheng Zhang
(74) *Attorney, Agent, or Firm* — Bereskin & Parr LLP/S.E.N.C.R.L., s.r.l.

(57) ABSTRACT

Systems and methods for WiFi mapping an industrial facility are disclosed. The system comprises a self-driving vehicle having a WiFi transceiver. The self-driving vehicle communicates with a fleet-management using the WiFi transceiver, via a WiFi access point. The self-driving vehicle receives a mission from the fleet-management system, and moves to a destination location based on the mission, using autonomous navigation. While executing the mission, the self-driving vehicle simultaneously measures the received signal strength indication of the WiFi access point and other WiFi access points in the facility, and stores the received signal strength indication in association with the location at which the received signal strength indication was measured.

20 Claims, 7 Drawing Sheets

SYSTEMS AND METHODS FOR WIFI MAPPING IN AN INDUSTRIAL FACILITY

CROSS-REFERENCE TO RELATED APPLICATIONS

This application claims priority to U.S. Provisional Patent Application No. 62/525,161 that was filed on 26 Jun. 2017, the contents of which are incorporated herein by reference for all purposes.

FIELD

The described embodiments relate to measuring and recording environmental characteristics, and in particular, to WiFi mapping in an industrial facility.

BACKGROUND

Autonomous vehicles represent significant advantages when used as material transport vehicles within an industrial facility. Generally, these vehicles, individually or operating as a fleet, communicate with each other, with fleet-management system, and with other IT infrastructure using wireless communications. As such, the operation of the vehicles within the facility can be dependent on the IT infrastructure installed within the facility.

In order to mitigate the likelihood of vehicle problems based on the IT infrastructure, it is often necessary to understand the strength of wireless communications signals within the facility. For example, a survey can be performed to determine the strength of the communications signals prior to deciding that the IT infrastructure is suitable for supporting a fleet of autonomous vehicles.

However, changes to the facility and the IT infrastructure can result in changes to the strength of communications signals over time. As such, it may be necessary to perform a subsequent survey, which can be costly and cumbersome. An effective means of continuously updating a survey of communications signal strength is desired.

SUMMARY

In a first aspect, there is a system for WiFi mapping in an industrial facility. The system comprises a self-driving vehicle that has a WiFi transceiver in communication with a fleet-management system via a first WiFi access point. The self-driving vehicle has a drive system for moving the vehicle and a control system for autonomously navigating the vehicle. The control system has at least one non-transitory computer-readable medium and a processor. The medium stores instructions that, when executed, cause the processor to be configured to: receive a mission comprising a destination location from the fleet-management system via the WiFi transceiver; instruct the drive system to move the vehicle to the destination location based on autonomous navigation; determine a measurement location based on the autonomous navigation; receive a WiFi received signal strength indication via the WiFi transceiver associated with the measurement location; and store a value based on the received signal strength indication in association with the measurement location on the at least one medium.

According to some embodiments, the instructions further comprise instructions that, when executed, cause the processor to be configured to: receive a second mission comprising a second destination location from the fleet-management system via the WiFi transceiver; subsequent to the vehicle moving to the destination location, instruct the drive system to move the vehicle to the second destination location based on autonomous navigation; subsequent to receiving the WiFi received signal strength indication, receiving a second WiFi received signal strength indication while the vehicle is in proximity of the measurement location; and replace the stored value with an updated value based on the second received signal indication in association with the measurement location.

According to some embodiments, the instructions further comprise instructions that, when executed, cause the processor to be configured to: determine a second measurement location based on the autonomous navigation; receive a second WiFi received signal strength indication via the WiFi transceiver associated with the second measurement location; and store a second value based on the second received signal strength indication in association with the second measurement location on the at least one medium.

According to some embodiments, the instructions further comprise instructions that, when executed, cause the processor to be configured to: receive a second WiFi received signal strength indication via the WiFi transceiver associated with the measurement location; and store a second value based on the second received signal strength indication in association with the measurement location. The received signal strength indication pertains to the first WiFi access point and the second received signal strength indication pertains to a second WiFi access point.

According to some embodiments, the WiFi receiver is connected to the first WiFi access point and the WiFi receiver is not connected to the WiFi access point, and the second received signal strength indication is obtained by performing a background scan.

In a second aspect, there is a method for WiFi mapping in a facility. The method comprises moving the vehicle to a first destination location based on autonomous navigation. At a first time while moving the vehicle to the first destination location, a WiFi receiver of the vehicle is used to obtain a first received signal strength indication. A first location of the vehicle based on the first time is determined, and a value based on the first received signal strength indication is stored in association with the first location. The first destination location is determined based on a first mission, and the first mission is independent of obtaining the at least one received signal strength.

According to some embodiments, the method further comprises moving the vehicle to a second destination location based on autonomous navigation. At a second time when the vehicle is in proximity of the first location, the WiFi receiver is used to obtain a second received signal strength indication. The stored first value is then replaced with a second value that is based on the second received signal strength indication in association with the first location. The second destination location is determined based on a second mission that is independent of the first mission, independent of obtaining the first received signal strength indication, and independent of obtaining the second received signal strength indication.

According to some embodiments, the method further comprises using the WiFi receiver to obtain a second received signal strength indication at a second time while the vehicle is moving to the first destination location. A second location of the vehicle is determined based on the second time. A second value based on the second received signal strength indication is stored in association with the second location.

According to some embodiments, the method further comprises using the WiFi receiver of the vehicle to obtain a second received signal strength indication during the first time, and storing a second value based on the second received signal strength indication in association with the first location. The first received signal strength indication pertains to a first WiFi access point and the second received signal strength indication pertains to a second WiFi access point.

According to some embodiments, the WiFi receiver is connected to the first WiFi access point and the WiFi receiver is not connected to the second WiFi access point. Using the WiFi receiver to obtain the second received signal strength indication comprises performing a background scan on the second WiFi access point.

In a third aspect, there is a method for WiFi mapping in a facility. The method comprises receiving a mission from a fleet-management system with a self-driving vehicle. The mission has a destination location. A current WiFi heat map of the facility is received. Based on the current WiFi heat map, a preferred measurement location is determined. The vehicle is moved to the preferred measurement location and the destination location based on autonomous navigation. While moving the vehicle, a WiFi receiver of the vehicle is used to obtain a plurality of signal strength indications associated, respectively, with a plurality of measurement locations. An updated WiFi heat map is stored based on the current WiFi heat map, the plurality of signal strength indications, and the plurality of measurement locations associated with the signal strength indications.

According to some embodiments, the preferred measurement location is determined based on the current WiFi heat map and the destination location.

According to some embodiments, the current WiFi heat map comprises values associated with locations in the facility. Storing the updated heat map comprises storing updated values based on the plurality of signal strength indications.

In a fourth aspect, there is a method for determining environmental characteristics with a self-driving vehicle. The method comprises moving the vehicle to a first destination location based on autonomous navigation. At a first time while moving the vehicle to the first destination location, at least one sensor of the vehicle is used to obtain a first measurement of at least one environmental characteristic. A first location of the vehicle is determined based on the first time. The first measurement is stored in association with the first location. The first destination location is determined based on a first mission that is independent of sensing the at least one environmental characteristic.

According to some embodiments, the method further comprises moving the vehicle to a second destination location based on autonomous navigation. At a second time when the vehicle is in proximity of the first location, the at least one sensor of the vehicle is used to obtain a second measurement of the at least one environmental characteristic. The stored first measurement is replaced with the second measurement in association with the first location. The second destination location is determined based on a second mission that is independent of sensing the at least one environmental characteristic and the first mission.

According to some embodiments, the at least one sensor is a WiFi receiver, the at least one environmental characteristic comprises a first WiFi signal from a first WiFi access point, and the first measurement is a first signal strength measurement of the first WiFi signal and the second measurement is a second signal strength measurement of the first WiFi signal.

BRIEF DESCRIPTION OF THE DRAWINGS

A preferred embodiment of the present invention will now be described in detail with reference to the drawings, in which.

DESCRIPTION OF EXEMPLARY EMBODIMENTS

Figure 1:
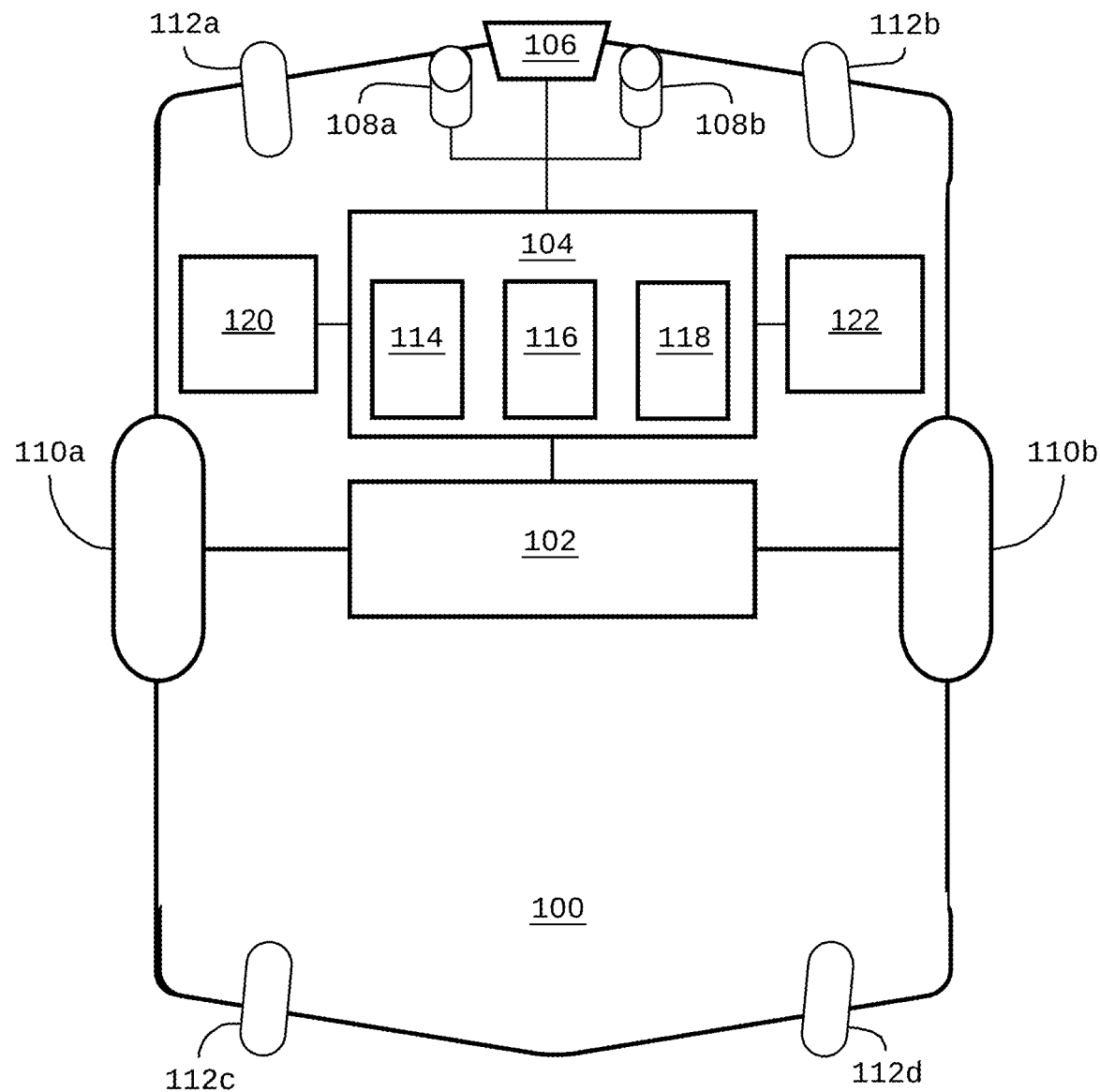
FIG. 1 is a system diagram of a self-driving material-transport vehicle, according to some embodiments.

Referring to FIG. 1, there is shown a self-driving material-transport vehicle 100 according to some embodiments. The vehicle comprises a drive system 102, a control system 104, and one or more sensors 106, 108a, and 108b.

The drive system 102 includes a motor and/or brakes connected to drive wheels 110a and 110b for driving the vehicle 100. According to some embodiments, the motor may be an electric motor, combustion engine, or a combination/hybrid thereof. Depending on the particular embodiment, the drive system 102 may also include control interfaces that can be used for controlling the drive system 102. For example, the drive system 102 may be controlled to drive the drive wheel 110a at a different speed than the drive wheel 110b in order to turn the vehicle 100. Different embodiments may use different numbers of drive wheels, such as two, three, four, etc.

According to some embodiments, additional wheels 112 may be included (as shown in FIG. 1, the wheels 112a, 112b, 112c, and 112d may be collectively referred to as the wheels 112). Any or all of the additional wheels 112 may be wheels that are capable of allowing the vehicle 100 to turn, such as castors, omni-directional wheels, and mecanum wheels.

The control system 104 comprises a processor 114, a memory 116, and a computer-readable non-transitory medium 118. The controls system 104 is in communication with (or includes) a communications transceiver 120 for communications with other systems, such as a fleet-management system. Generally speaking control systems in self-driving vehicles comprise communications transceivers; and the communications transceiver 120 is specifically included in FIG. 1 due to the relevance of the transceiver 120 as a type of sensor for sensing environmental characteristics, as further described herein.

One or more navigational sensors 106, 108a, and 108b may be included in the vehicle 100. For example, according to some embodiments, the navigational sensor 106 may be a LiDAR device (or other optical/laser, sonar, or radar range-finding sensor). The navigational sensors 108a and 108b may be optical sensors, such as video cameras. According to some embodiments, the navigational sensors 108a and 108b may be optical sensors arranged as a pair in order to provide three-dimensional (e.g. binocular or RGB-D) imaging.

The control system 104 uses the medium 118 to store computer programs that are executable by the processor 114 (e.g. using the memory 116) so that the control system 104 can provide automated or autonomous operation to the vehicle 100. Furthermore, the control system 104 may also store an electronic map that represents the known environment of the vehicle 100, such as a manufacturing facility, in the media 118.

For example, the control system 104 may plan a path for the vehicle 100 based on a known destination location and the known location of the vehicle. Based on the planned path, the control system 104 may control the drive system 102 in order to drive the vehicle 100 along the planned path. As the vehicle 100 is driven along the planned path, the navigational sensors 106, and/or 108a and 108b may update the control system 104 with new images of the vehicle's environment, thereby tracking the vehicle's progress along the planned path and updating the vehicle's location.

Since the control system 104 receives updated images of the vehicle's environment, and since the control system 104 is able to autonomously plan the vehicle's path and control the drive system 102, the control system 104 is able to determine when there is an obstacle in the vehicle's path, plan a new path around the obstacle, and then drive the vehicle 100 around the obstacle according to the new path.

According to some embodiments, the vehicle 100 may receive a mission from a fleet-management system or other external computer system in communication with the vehicle 100 (e.g. in communication via the transceiver 120). In this case, the mission contains one or more waypoints or destination locations. Based on the waypoint or destination location contained in the mission, the vehicle 100, based on the control system 104, can autonomously navigate to the waypoint or destination location without receiving any other instructions from an external system. For example, the control system 104, along with the navigational sensors 106, and/or 108a, and 108b, enable the vehicle 100 to navigate without any additional navigational aids such as navigational targets, magnetic strips, or paint/tape traces installed in the environment in order to guide the vehicle 100.

In addition to using the communications transceiver 120 for communicating with other systems, such as a fleet-management system, the vehicle 120 may use the transceiver 120 as a receiver or sensor in order to measure the signal strength of a communications signal as an environmental characteristic. Furthermore, the vehicle 100 may include one or more additional environmental sensors 122.

As used here, the term "transceiver", "receiver" and "sensor" may all be used to refer to a device that detects environmental characteristics. In particular, a "transceiver" necessarily includes a "receiver", and these terms denote devices that detect communications signals (i.e. electromagnetic waves) within an environment.

According to some embodiments, the transceiver 120 may be a WiFi™ transceiver, thereby including a WiFi receiver. According to some embodiments, the transceiver 120 may utilize other wireless communications schemes, for example, a cellular communication scheme.

According to some embodiments, the additional environmental sensors 122 may comprise any or all of another wireless transceiver (e.g. WiFi, cellular), a thermal sensor for measuring temperature, an optical or photo sensor for measuring light (e.g. ambient light), a humidity sensor for measuring relative humidity, chemical-absorbent sensors for measuring airborne toxin levels, and radiation sensors. Generally, the systems and methods described here can be used to determine signal levels of communications signals such as WiFi within an industrial facility; as well as other environmental characteristics that may be relevant to worker safety, product quality, process efficiency, and operations of the facility.

The communications transceiver 120 and the other environmental sensors 122 are in communication with the control system 104. As such, the control system 104 may receive data from the environmental sensors 120 and 122. Furthermore, according to some embodiments, the control system 104, including the processor 114, the memory 116, and the computer-readable non-transitory medium 118, may be configured to perform the methods described herein. For example, the medium 118 may store computer-readable instructions that, when executed by the processor 114, cause the processor 114 to be configured to perform the methods. According to some embodiments, any or all of the methods may be performed by either or both of the control system 104 and a fleet-management system in communication with the control system 104.

According to some embodiments, the processor 114 may produce a product that is stored on the medium 118 and/or on a fleet-management system, that includes a map of the measured environmental characteristics in association with, or independent of the electronic map of the facility that is used by the control system 104 in the autonomous navigation of the vehicle 100.

Figure 2:
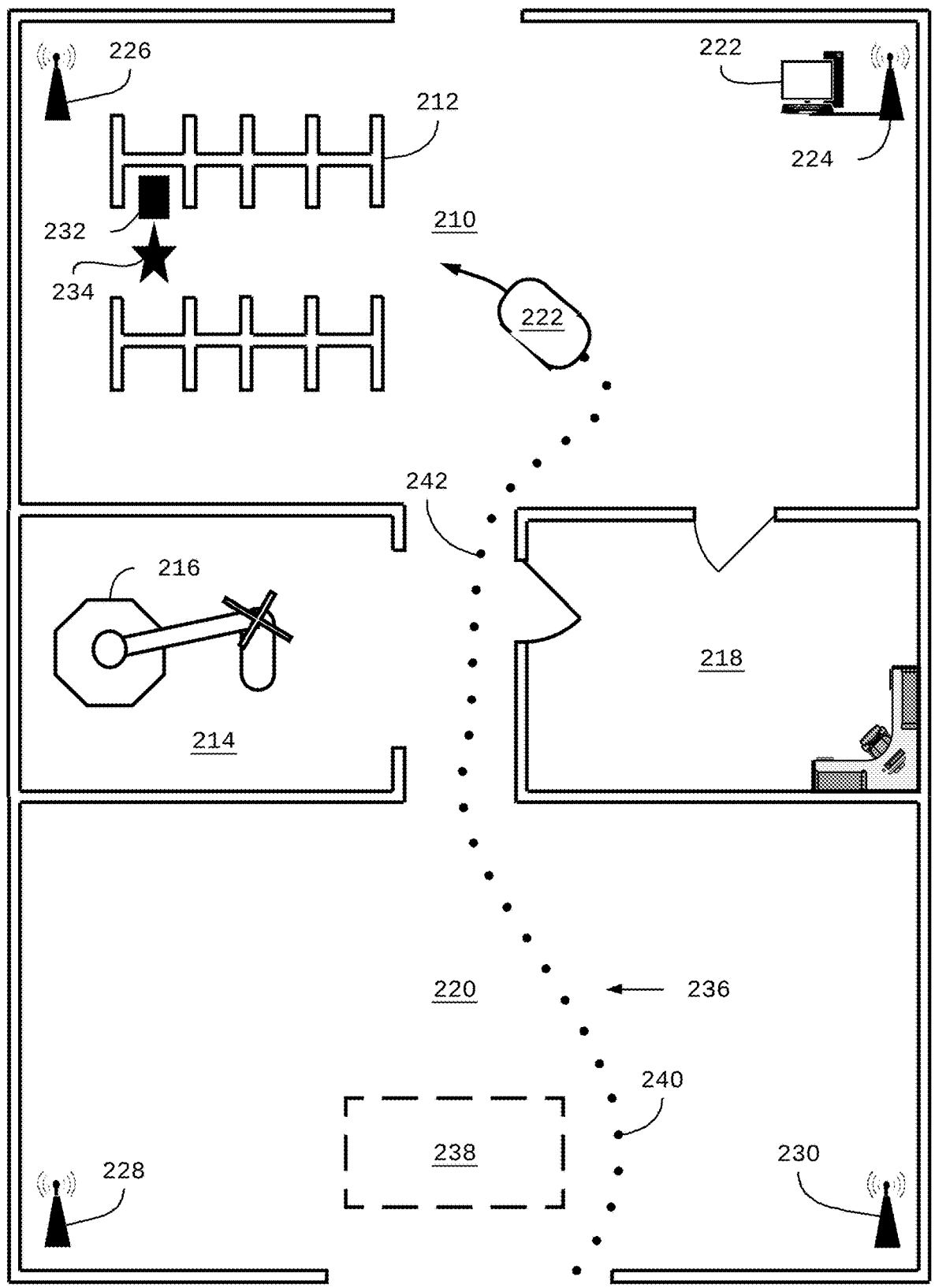
FIG. 2 is a plan view of a facility in which a system for measuring and recording environmental characteristics can be deployed, according to some embodiments.

Referring to FIG. 2, there is shown a facility 200 in which a system for measuring and recording environmental characteristics can be deployed according to some embodiments. The facility 200, as shown, is an example of an industrial manufacturing facility. The facility 200 generally comprises an inventory area 210 having a shelf 212 for storing inventory items, a machining area 214 having a machine 216 for doing work on a workpiece, a work room 218, and a finished goods area 220.

A self-driving vehicle 222 operates within the facility 200 in order to provide various material-transport tasks within the facility 200. Generally, the self-driving vehicle is capable of autonomous navigation, as previously described. The vehicle 222 may fulfill tasks according to missions assigned by a fleet-management system 224. As shown in FIG. 2, the fleet-management system 224 is connected to a WiFi access point 224. Three other WiFi access points 226, 228, and 230 are located in the facility 200, enabling a communications network in which the vehicle 222 can communicate with the fleet-management system 224 or other vehicles throughout the facility 200.

As used here, the term "WiFi" refers generally to any wireless local-area networking technology and protocols. For example, WiFi may refer to systems and protocols that employee an IEEE 802.11 standard.

In an example depicted in FIG. 2, the fleet-management system 224 has sent a mission to the vehicle 222 to pick up a workpiece 232 from the shelf 212, and deliver it to the machine area 214 so that the workpiece can be machined by the machine 215. As such, the mission includes a destination location 234 adjacent to the shelf 212.

The dotted line 236 indicates the travel path of the vehicle 222 since it received its mission from the fleet-management system 224. As shown, the vehicle 222 has autonomously navigated around a finished-goods area 238 and towards the destination location 234.

According to some embodiments, as the vehicle 222 is moving towards the destination location 234, it is continuously, intermittently, periodically, or arbitrarily using its environmental sensors to obtain measurements of environmental characteristics throughout the facility 200. According to some embodiments, the measurements may be taken periodically (i.e. according to frequency of measurements), or based on the vehicle 222 traveling a particular distance since the last measurement was obtained. According to some embodiments, each dot of the dotted line 236 represents a different measurement location at which a measurement was obtained.

According to some embodiments, the vehicle 222 uses its WiFi receiver to determine a received signal strength indication at the dot 240. For example, the vehicle 222 may have been connected (i.e. communicating digital information with) the access point 230, and therefore may have received a signal strength indication from the access point 230 at the measurement location 240. As the vehicle 222 travelled along the line 236, it may have subsequently dropped its connection with the access point 230 in order to connect with other access points. For example, the dot 242 may represent a measurement location at which the vehicle 222 was connected to the access point 224.

As used herein with respect to WiFi transceivers and WiFi access points, the term "connected" means that the WiFi transceiver and WiFi access point are communicating with each other using a digital communications protocol; which does not require a mechanical connection.

According to some embodiments, the vehicle 222 may obtain measurements of more than one environmental characteristics at a single measurement location. For example, at measurement location 240, the vehicle 222 may have obtained received signal strength indication from the access point 230 to which it was connected, as well as receiving a signal strength indication from the access point 228. According to some embodiments, while connected to the access point 230, the vehicle may obtain a received signal strength indication from the access point 228 by performing a background scan.

According to some embodiments, the vehicle 222 may associate each obtained measurement with the time at which the measurement was obtained.

Figure 3:
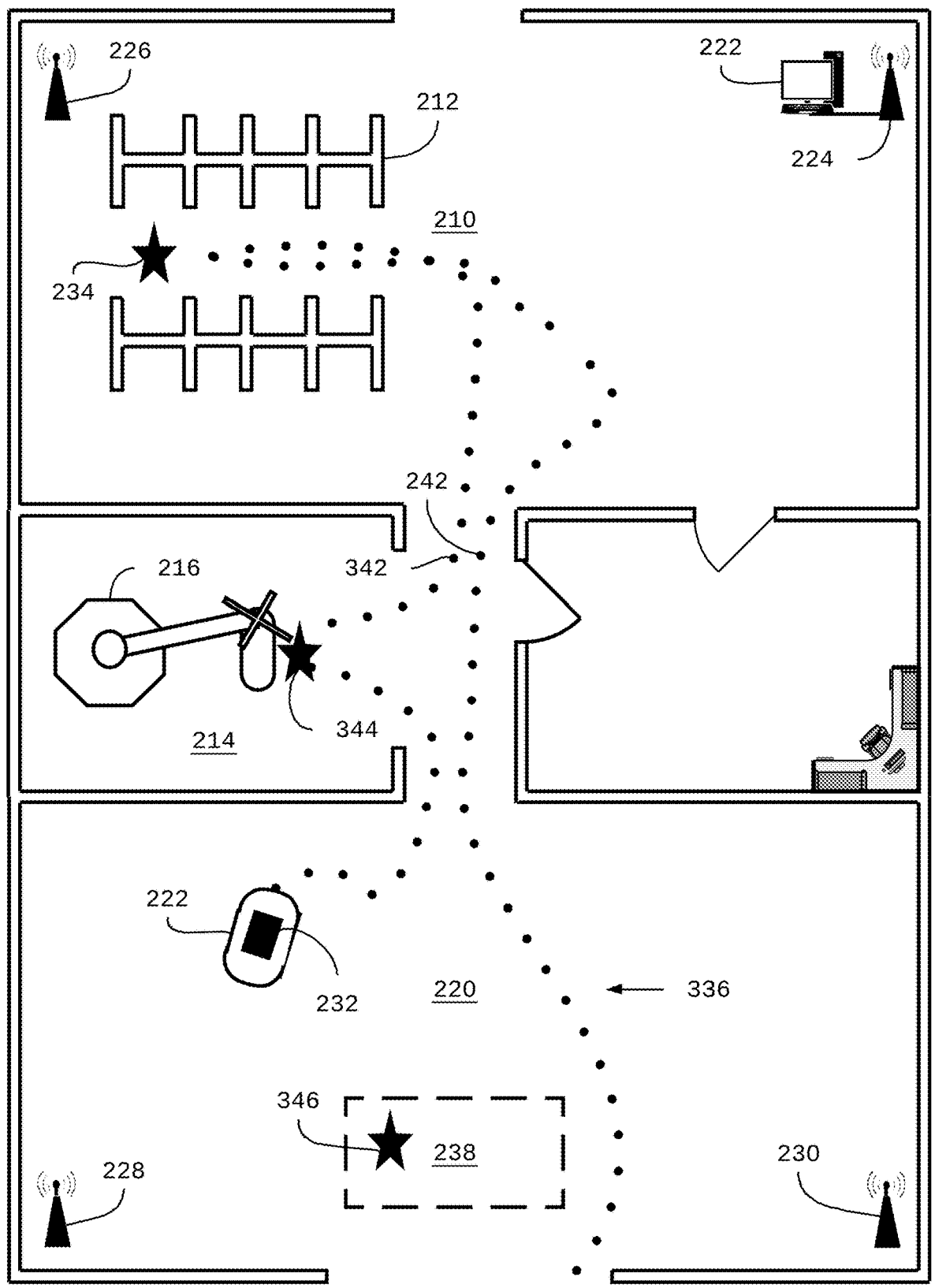
FIG. 3 is a plan view of the facility of FIG. 2 depicting the system for measuring and recording environmental characteristics at a time subsequent to the time in FIG. 2.

Referring to FIG. 3, there is a is shown the facility 200 at a time subsequent to that shown in FIG. 2. As shown, subsequent to picking up the workpiece at the destination location 234, the vehicle 222 has travelled to the destination location 344 in order for the workpiece 232 to be machined by the machine 216, and is transporting the workpiece 232 to the finished-goods area 238. The dotted line 336 indicates the travel path of the vehicle 222 since it received its mission from the fleet-management system 224.

As shown, after picking up the workpiece 232 at the first destination location 234, the vehicle 222 started moving back, approximately, along its path to the destination location 234. In doing so, the vehicle 222 obtained measurements at new measurement locations in the inventory area 210, and also moved over previously-used measurement locations. According to some embodiments, a measurement location may be defined in terms of an area (e.g. a proximity to a particular measurement location point) such that, when the vehicle 222 is within the area (i.e. within proximity) of a previously-used measurement location, the subsequent measurement obtained at that measurement location may be associated with the previously-used measurement location rather than a new measurement location.

For example, according to some embodiments, the measurement location 342 may be deemed to be sufficiently close to the measurement location 242 such that the measurement obtained at the dot 342 is associated with the same measurement location as the measurement previously obtained at the dot 242.

According to some embodiments, when a measurement is obtained at a previously-used measurement location, each measurement obtained at the measurement location may be associated with the time at which the measurement was obtained. In this way, differences in measurements taken at the same location but at different times can be determined in order to identify variances in the environmental characteristics. According to some embodiments, statistics can be determined over time for the environmental characteristics at a particular location based on other obtained measurements that are adjacent in time and/or space.

At the time shown in FIG. 3, the vehicle 222 may have been connected to any or all of the WiFi access points 224, 226, 228, and 230 at some time, and/or obtained background scan information from them. As compared to the time shown in FIG. 2, in FIG. 3, the vehicle 222 has made more measurements (e.g. one for each dot in the line 336). Generally, as the vehicle 222 travels through the facility 200, it obtains more measurements of the environmental characteristics (e.g. WiFi received signal strength indications). According to some embodiments, each measurement is stored (e.g. on the vehicle's control system or other computer) in association with the corresponding measurement location.

Figure 4:
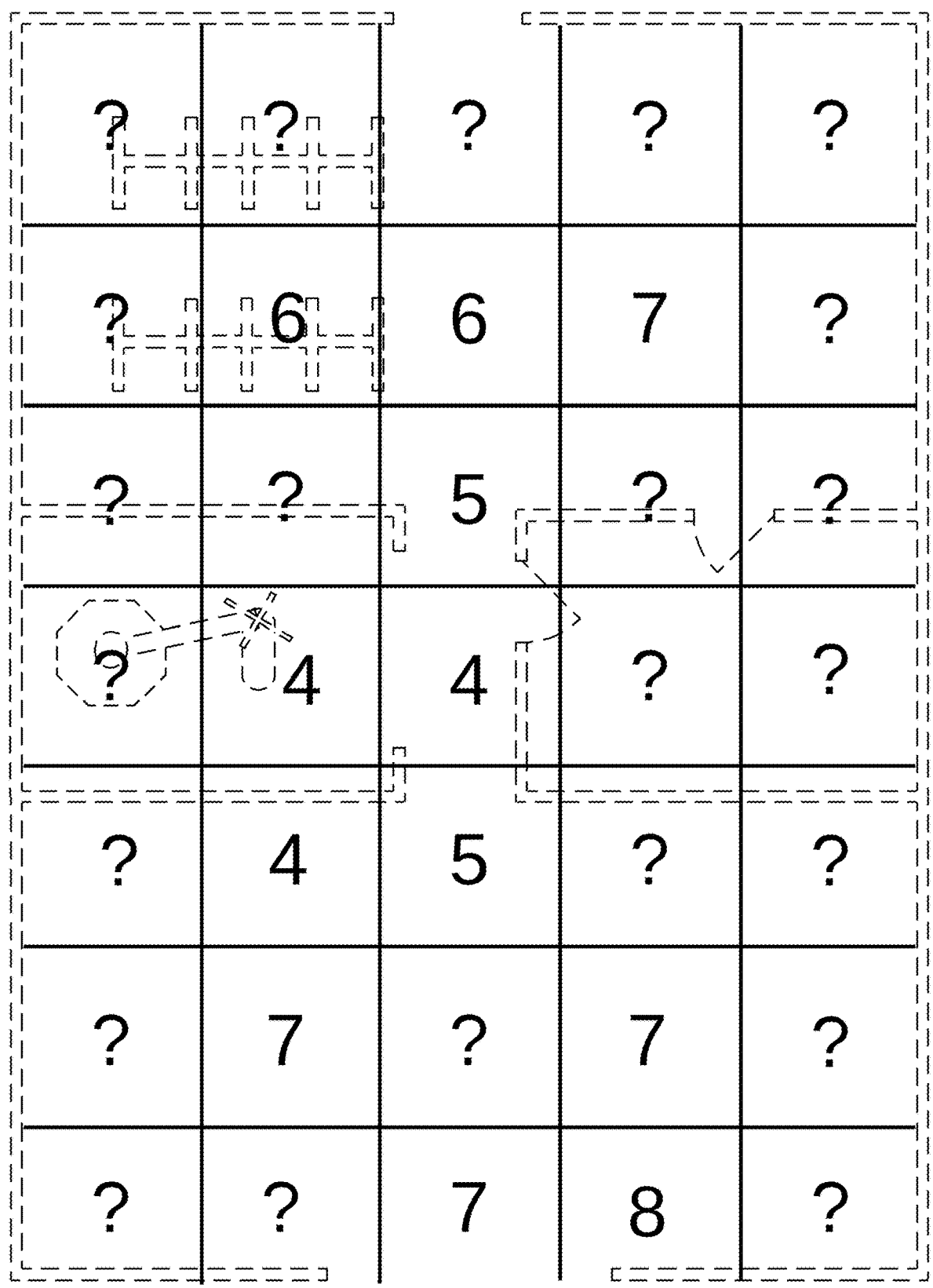
FIG. 4 is a map of the values of the measurements obtained in FIG. 3.

Referring to FIG. 4, there is shown a map 400 of the values of the measurements obtained in FIG. 3 in respect of the facility 200. According to some embodiments, the values may be stored in a data structure, in association with locations relative to the facility 200, on the vehicle's control system or another computer system such as a fleet-management system or another computer terminal connected thereto. According to some embodiments, a visual heat map may be generated and displayed by a computer terminal that includes displaying a visual layout of the facility 200 overlaid with the values of the obtained measurements.

As depicted, the values shown represent the obtained measurements of environmental characteristics normalized on a scale of one to ten. Other units and scales may be used. For example, WiFi signals may be represented in decibels. In the example of FIG. 4, question marks "?" are used to indicated that no measurements have been obtained for the associated locations.

The map 400 may be referred to as a "heat map". Generally, the example of FIG. 4 shows a heat map in the form of a grid with relatively large-scale grid lines. This is for the sake of example and description. According to some embodiments, a heat map may be generated based on a resolution commensurate with the distribution (in time or space) of the measurements. According to some embodiments, the heat map may be considered as comprising discrete regions (e.g. a grid) with a value for each region that is based on one or more obtained measurements within that region. According to some embodiments, the value for a region may be determined by statistics applied to a sample of the measurements obtained from within the region.

According to some embodiments, the map may be in the form of a tessellation that may comprise polygons such as triangles, quadrilaterals, pentagons, hexagons, heptagons, octagons, etc. For example, a tessellation may be used to support a triangulated irregular network.

The example map 400 indicates that the values for received signal strength indications are generally higher in locations that are closer to a WiFi access points.

According to some embodiments, more than one value may be associated with a point or region on the map, corresponding to more than one environmental characteristic. For example, each grid in the map 400 could have a value represented in the form $\{N_1, N_2, N_3, N_4, t\}$, referring, respectively to the received signal strength indications from each of the WiFi access points 224, 226, 228, and 230, and the time at which the received signal strength indications were obtained. According to some embodiments, the time may be recorded as a single time that approximates the sequence of times at which each received signal strength indication was received. According to some embodiments, a separate time may be recorded for each received signal strength indication.

According to some embodiments, a map may be derived in a similar manner as the map 400 based on differences and variations in the map over time rather than the obtained values themselves. In other words, if multiple values are obtained at a particular location or time (or adjacent to or in proximity of the location), and the obtained measurements are recorded with their associated times of measurement, then a map can be derived based on the differences over time. According to some embodiments, a difference threshold may be determined such that, if the difference between obtained measurements at a particular location exceed the threshold, a notification can be made with respect to the map so that a human user can be notified to investigate the change.

According to some embodiments, a map may be derived based on statistics, interpolations, and/or extrapolations of the obtained measurements rather than the obtained measurements themselves. For example, a triangulated irregular network may be used.

Figure 5:
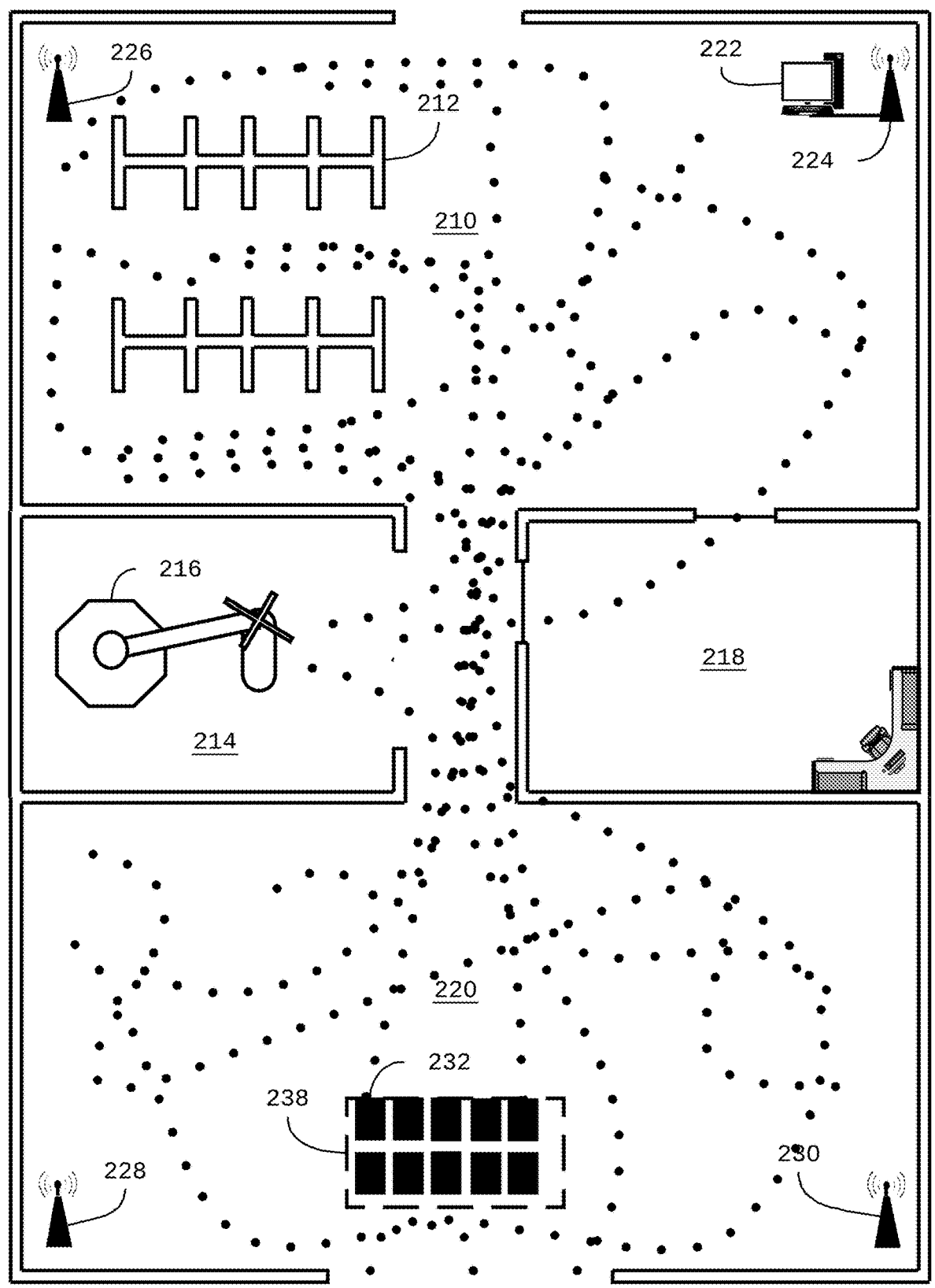
FIG. 5 is a plan view of the facility of FIG. 2 depicting the system for measuring and recording environmental characteristics at a time subsequent to the time in FIG. 3.

Referring to FIG. 5, there is shown the facility 200 at a time subsequent to that shown in FIG. 3. As shown, the vehicle 222 has executed multiple missions, and travelled to multiple destination locations, thereby obtaining measurements from throughout the facility 200. This is represented by the increased number of dots (i.e. dotted lines marking the paths of the vehicle 222) as compared to FIG. 3.

The scene depicted in FIG. 5 has several differences from the scenes in FIG. 3 and FIG. C (though not all differences are represented visually). In particular, the workpiece 232 is located in the finished-goods area 238 rather than the shelf 212; and there are several workpieces in the finished-goods area. The doors of the work room 218 are closed. The machine 216 is operating, including the operation of a high-speed electric motor.

According to some embodiments, the autonomous navigation of the vehicle 222, including its path planning and obstacle-avoidance capabilities may result in travel paths (i.e. the distribution of the dots in FIG. 5) that are more distributed than would be possible using a more deterministic means of material transport. In other words, since the measurements are obtained by self-driving vehicles according to autonomous navigation, over time, the spatial distribution of the measurement locations will be proportionate to the likelihood of a vehicle being in the associated part of the facility. On one hand, the vehicle 222 is unlikely to follow the exact same path twice in a row. On the other hand, there are certain regions of the facility that will be more frequently travelled. For those regions of the facility that are not frequently travelled, fewer measurements will be obtained; but the inherent interest of those measurements will be lower.

Figure 6:
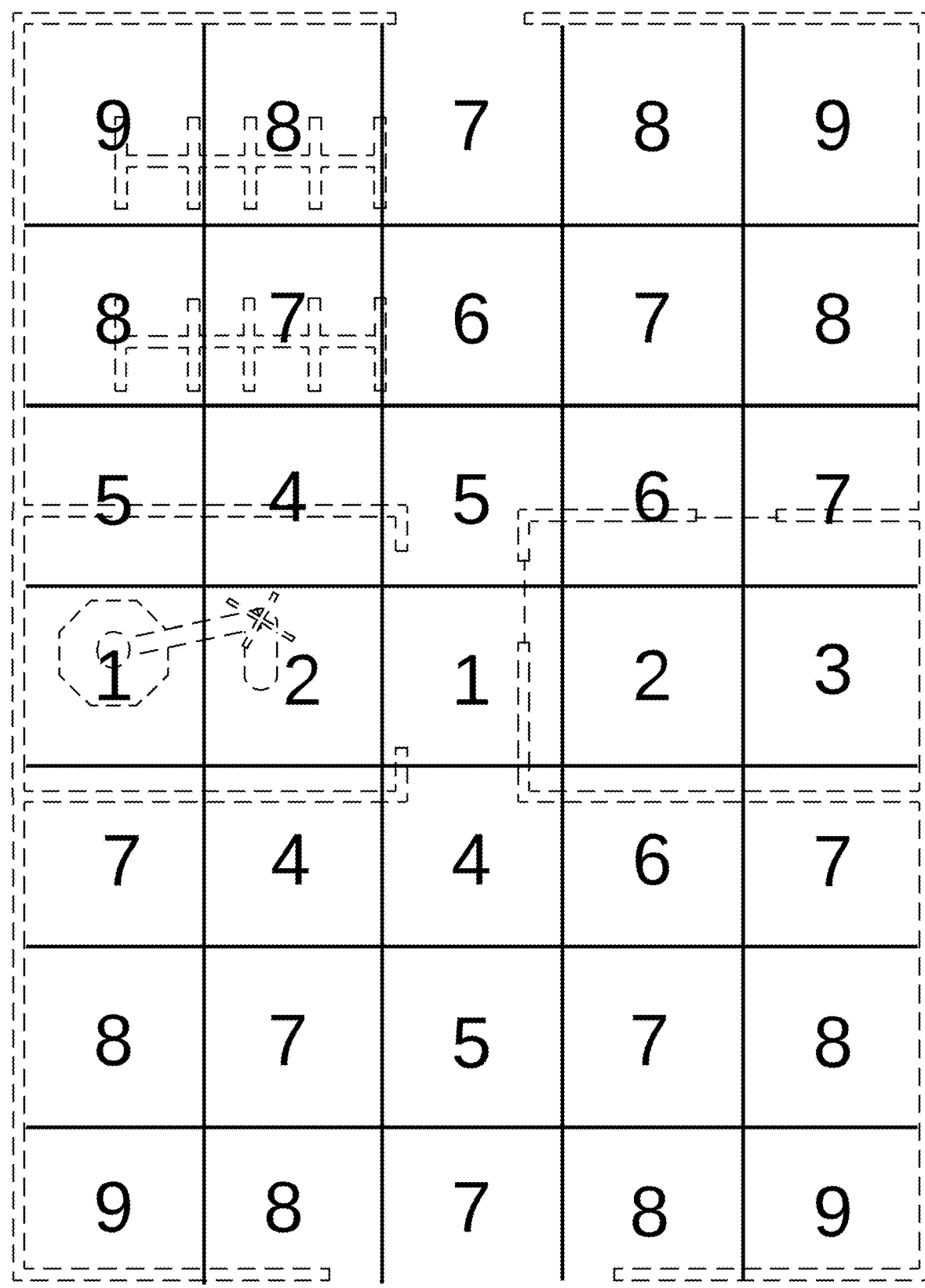
FIG. 6 is a map of the values of the measurements obtained in FIG. 5.

Referring to FIG. 6, there is shown a map 600 of the values of the measurements obtained in FIG. 5 in respect of the facility 200. Reflective of the distinctions between the scenes of FIG. 5 and the scenes of FIG. 2 and FIG. 3, there are corresponding differences between the heat map 600 in FIG. 6 and the heat map 400 in FIG. 4.

All of the value question marks ("unknown") in the map 400 have been replaced with numerical values. According to some embodiments, this may be because the vehicle 222 has passed through all of the squares in the grid during a previous mission. According to some embodiments, a value may be assigned to a square in the grid (e.g. to a location on the map) by using on an interpolation or estimation based on the values in other squares in the grid (e.g. at other locations on the map) along with, or in the absence of obtained measurements from within the square.

The value in the square to the right of the destination location 234 has been changed from a "6" in the map 400 to a "7" in map 600. It may be inferred that the geometry and/or materials of the workpiece 232 attenuated the WiFi signal from the access point 226, and thus, removing the workpiece 232 from the shelf 212 resulted in an increase in the received signal strength indication at the map location.

The value in the square above the finished-goods area 238 has been changed from a "?" in the map 400 to a "5" in map 600. At first glance, it may appear that this merely a known value replacing a state of "unknown". However, upon closer inspection, it can be seen that the value "5" appears to be lower than expected, since three of the four adjacent squares contain a value of "7". (E.g. the expected value for the square above the finished-goods area 238 may be been "6" rather than "5"). Thus, an inference may be drawn that the workpieces that have been placed in the finished-goods area 238 are attenuating the WiFi signals from the access points 228 and 230.

The values for the squares corresponding to the machine area 214 are "1" and "2", which appear to be significantly lower than expected. An inference may be drawn, or further investigation may reveal that the high-speed electric motor of the machine 216 is causing interference with the WiFi signal from the access points 226 and 228.

Furthermore, the squares that are two-above and three-above the finished-goods area 238 appear to be lower than expected. These values may be effected by the attenuation of the WiFi signals from the access points 228 and 230 by the workpieces in the finished goods area 238 in combination with the interference caused by the operation of the machine 216.

Similarly, the value of "1" in the center square may be a result of several factors, including the interference caused by the operation of the machine 216, the closed doors of work space 218, and the workpieces in the finished-goods area 238.

Figure 7:
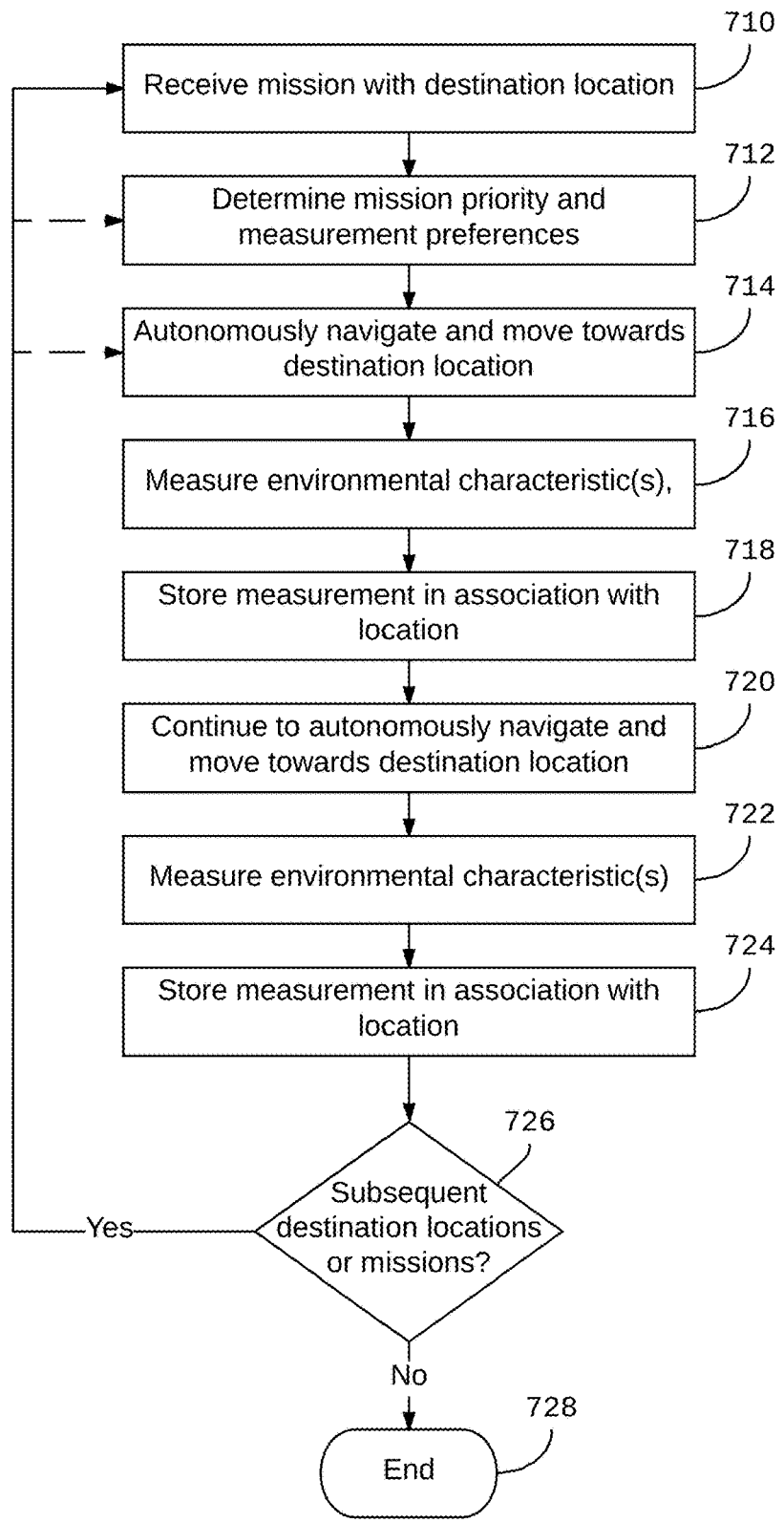
FIG. 7 is a flow diagram depicting a method for measuring and recording environmental characteristics, according to some embodiments.

Referring to FIG. 7 there is shown a method 700 for WiFi mapping of an industrial facility, and, more generally, for measuring and storing environmental characteristics. According to some embodiments, the method 700 may be stored as computer instructions stored on non-transitory computer-readable media on any or all of a self-driving material-transport vehicle, a fleet-management system, and an enterprise resource planning system. Each of the vehicle, fleet-management system, and enterprise resource planning system include at least one processor and memory such that the computer instructions can be used to configure the processors to execute any or all of the steps of the following methods.

The method begins at step 710 when the vehicle receives a mission from the fleet-management system. Generally, the vehicle communicates with the fleet-management system using the vehicle's WiFi transceiver, through one or more WiFi access points within the facility. The mission includes one or more destination locations to which the vehicle is to be moved.

At step 712, a determination is made with respect to the mission priority and whether there are any preferred locations for obtaining measurement. According to some embodiments, if an existing heat map includes areas that have a low density of obtained measurements (in terms of time and/or space), or a relatively long time has passed since the most-recent measurement was obtained for a location, then the vehicle may be sent to particular locations in order to obtain measurements. In other words, in some cases, it is possible to navigate the vehicle based on the current state of the heat map, in order to gather data to update and populate the heat map itself.

According to some embodiments, a mission priority may be determined. The mission priority represents the availability for the vehicle to travel to locations that would otherwise be unnecessary for the mission, without jeopardizing the mission itself. For example, some missions may be time-critical, and there may be insufficient time available for a vehicle to deviate from the shortest path to the destination location while still satisfying the mission. Other missions may not be time-critical such that the vehicle is available to travel to preferred measurement locations on its way to the destination location.

At step 714, the vehicle autonomously navigates and moves towards the destination location. For example, the mission may stipulate that the vehicle is to pick up a workpiece from a storage location and deliver it to a machine cell. In this case, the destination locations may be the storage location and the location of the machine cell. In accordance with the mission, the vehicle moves towards the destination location. In the case of a mission including multiple destination locations, this means moving towards the next destination location specified by the mission.

In the event that a determination was made at step 712 that the vehicle should be sent to locations in order to obtain measurements at those locations, then at step 714, the vehicle may navigate through preferred measurement locations while navigating towards the destination location. According to some embodiments, the mission may be altered to include the preferred measurement locations as intermediate "destination locations". According to some embodiments, the vehicle's control system may navigate through the preferred measurement locations on the way to the destination location without altering the mission itself.

At step 716, while the vehicle is executing the mission, the environmental sensors on the vehicle measure the environmental characteristics along the vehicle's travels. According to some embodiments, the WiFi receiver on the vehicle measures the received signal strength indication as the vehicle is travelling along its planned path to the destination location. In this way, the self-driving vehicle is simultaneously accomplishing two separate and unrelated goals. First, it is performing the mission as provided by the fleet-management system. Second, it is gathering data with respect to environmental characteristics in the facility. For example, the vehicle can determine the WiFi received signal strength indication as it travels through the facility, while simultaneously (and independent from) performing it's primary role as a material-transport vehicle.

According to some embodiments, at step 716, the vehicle may obtain more than one measurement at a particular location or time (or within a proximity of a particular location or time). According to some embodiments, for a particular measurement location (or within a proximity thereof), the vehicle may obtain one measurement of a particular environmental characteristic, and another measurement of another environmental characteristic. For example, the vehicle may obtain a temperature measurement and a humidity measurement. For example, the vehicle may obtain a received signal strength indication from a first WiFi access point and another received signal strength indication from a second WiFi access point.

At step 718, the measurement (e.g. WiFi received signal strength indication) obtained at step 716 is stored in association with the location at which the measurement was obtained. According to some embodiments, the measurement is stored on a non-transient computer-readable medium, for example, that is a part of the vehicle's control system. According to some embodiments, the measurement is stored in terms of a map (e.g. "heat map") in which the value of the measurement is stored with respect to the measurement location on the map. According to some embodiments, the measurement and associated location are transmitted to the fleet-management system and stored on the fleet-management system.

At step 720, the vehicle continues to move towards the destination location according to its autonomous navigation. According to some embodiments, step 720 is illustrated in FIG. 7 in order to describe that the measurements are obtained while the vehicle is simultaneously moving and navigating with respect to the mission. According to some embodiments, the measurements may be obtained regardless of whether the vehicle actually moving or navigating at any particular instant, and regardless of whether the vehicle is at the destination location or on its way to the destination location.

According to some embodiments, at step 722, the vehicle may obtain another measurement at another measurement location on its way to the destination location. According to some embodiments, the vehicle may obtain measurements periodically (in time) or after a pre-determined displacement (in space) as it travels along its planned path to the destination location. At step 724, the measurements taken at step 722 are stored in association with their respective measurement locations, similar to as described for step 718.

The vehicle eventually arrives at the destination location. At step 726, a determination is made as to whether there are other destination locations specified in the mission, or whether another mission is to be received by the fleet-management system. The method proceeds to any of steps 710, 712, 714, and 728 accordingly.

In the event that another destination location is specified in the mission, the method returns to step 712 or 714 as indicated by the dashed lines. In the event that the vehicle receives another mission, the method returns to step 710. For subsequent destination locations and/or missions, the vehicle will either obtain measurements at new measurement locations within the facility, or it will obtain measurements at (or in proximity of) previously-used measurement locations.

In the event that a subsequent measurement is obtained in association with a previously-used measurement location, the subsequent (new) measurement may be stored in association with the measurement location. According to some embodiments, the new measurement may be stored in place of (i.e. replace, by deleting) the previously-stored measurement. According to some embodiment, more than one measurement, taken at different times, may be stored for the same location. According to some embodiments, more than one measurement may be used to determine a statistical value for the environmental characteristic at a particular location, for example, by taking different measurements over time at the same location, and/or by using measurements taken at adjacent or nearby locations.

The present invention has been described here by way of example only. Various modification and variations may be made to these exemplary embodiments without departing from the spirit and scope of the invention, which is limited only by the appended claims.

We claim:

1. A system for operating one or more self-driving vehicles for WiFi mapping in an industrial facility, the system comprising:

a self-driving vehicle having a WiFi transceiver in communication with a fleet-management system via a first WiFi access point;

the self-driving vehicle having a drive system for moving the self-driving vehicle and a control system for autonomously navigating the self-driving vehicle;

the control system having at least one non-transitory computer readable medium and a processor, the at least one medium storing instructions that, when executed, cause the processor to be configured to:

receive a mission data comprising a destination location and a mission priority from the fleet-management system via the WiFi transceiver;

determine a path to the destination location;

determine at least one preferred measurement location, wherein the at least one preferred measurement location comprises a location associated with at least one of a number of data points below a minimum data point threshold and data points associated with a measurement date that is older than a minimum measurement frequency threshold;

determine whether modifying the path to include the at least one preferred measurement location would cause the self-driving vehicle to exceed a mission completion time determined based on the mission priority;

in response to determining the modified path would not cause the self-driving vehicle to exceed the mission completion time, modify the path to include the at least one preferred measurement location as an intermediate location;

instruct the drive system to move the self-driving vehicle along the modified path to the destination location based on autonomous navigation;

receive a WiFi received signal strength indication via the WiFi transceiver when the self-driving vehicle is in proximity of the at least one preferred measurement location; and store a value based on the received signal strength indication in association with the at least one preferred measurement location on the at least one medium.

2. The system of claim 1, wherein the instructions further comprise instructions that, when executed, cause the processor to be configured to:

receive a second mission data comprising a second destination location from the fleet-management system via the WiFi transceiver;

subsequent to the self-driving vehicle moving to the destination location, instruct the drive system to move the self-driving vehicle to the second destination location based on autonomous navigation;

subsequent to receiving the WiFi received signal strength indication, receive a second WiFi received signal strength indication when the self-driving vehicle is in proximity of the at least one preferred measurement location; and replace the stored value with an updated value based on the second received signal indication in association with the at least one preferred measurement location.

3. The system of claim 1, wherein the instructions further comprise instructions that, when executed, cause the processor to be configured to:

receive a second WiFi received signal strength indication via the WiFi transceiver when the self-driving vehicle is remote to the at least one preferred measurement location;

determine a measurement location associated with a location of the self-driving vehicle when the second WiFi signal strength indication is received; and store a second value based on the second received signal strength indication in association with the measurement location on the at least one medium.

4. The system of claim 1, wherein the instructions further comprise instructions that, when executed, cause the processor to be configured to:

receive a second WiFi received signal strength indication via the WiFi transceiver when the self-driving vehicle is in proximity of the at least one preferred measurement location; and store a second value based on the second received signal strength indication in association with the at least one preferred measurement location;

wherein the received signal strength indication pertains to the first WiFi access point and the second received signal strength indication pertains to a second WiFi access point.

5. The system of claim 4, wherein the WiFi receiver is connected to the first WiFi access point and the WiFi receiver is not connected to the second WiFi access point; and the second received signal strength indication is obtained by performing a background scan.

6. A method for WiFi mapping in a facility with one or more self-driving vehicles, the method comprising:

receiving a mission data from a fleet-management system, the mission data comprising a destination location and a mission priority;

determining a path to the destination location;

determining at least one preferred measurement location, wherein the at least one preferred measurement location comprises a location associated with at least one of a number of data points below a minimum data point threshold and data points associated with a measurement date that is older than a minimum measurement frequency threshold;

determining whether modifying the path to include the at least one preferred measurement location would cause the self-driving vehicle to exceed a mission completion time determined based on the mission priority;

in response to determining the modified path would not cause the self-driving vehicle to exceed the mission completion time, modifying the path to include the at least one preferred measurement location as an intermediate location;

moving the self-driving vehicle along the modified path to the destination location based on autonomous navigation;

during operation of the self-driving vehicle along the modified path, using a WiFi receiver of the self-driving vehicle to obtain a received signal strength indication when the self-driving vehicle is in proximity of the at least one preferred measurement location; and storing a value based on the received signal strength indication in association with the at least one preferred measurement location.

7. The method of claim 6, further comprising:

receiving a second mission comprising a second destination location from a fleet-management system;

moving the self-driving vehicle to the second destination location based on autonomous navigation;

when the self-driving vehicle is in proximity of the at least one preferred measurement location, using the WiFi receiver to obtain a second received signal strength indication;

replacing the stored first value with a second value based on the second received signal strength indication in association with the at least one preferred measurement location.

8. The method of claim 6, further comprising:

using the WiFi receiver to obtain a second received signal strength indication when the self-driving vehicle is remote to the at least one preferred measurement location;

determining a measurement location of the self-driving vehicle corresponding to a location of the self-driving vehicle when the second received signal strength indication is obtained; and storing a second value based on the second received signal strength indication in association with the measurement location.

9. The method of claim 6 further comprising:

using the WiFi receiver of the self-driving vehicle to obtain a second received signal strength indication when the self-driving vehicle is in proximity of the at least one preferred measurement location; and storing a second value based on the second received signal strength indication in association with the at least one preferred measurement location;

wherein the first received signal strength indication pertains to a first WiFi access point and the second received signal strength indication pertains to a second WiFi access point.

10. The method of claim 9, wherein the WiFi receiver is connected to the first WiFi access point and the WiFi receiver is not connected to the second WiFi access point; and using the WiFi receiver to obtain the second received signal strength indication comprises performing a background scan on the second WiFi access point.

11. A method for operating one or more self-driving vehicles for WiFi mapping a facility, the method comprising:

receiving, with a self-driving vehicle, a mission data from a fleet-management system, the mission data having a destination location and a mission priority;

determining a path to the destination location;

receiving a current WiFi heat map of the facility;

determining at least one preferred measurement location based on the current WiFi heat map, wherein the at least one preferred measurement location comprises a location associated with at least one of a number of data points below a minimum data point threshold and data points associated with a measurement date that is older than a minimum measurement frequency threshold;

determining whether modifying the path to include the at least one preferred measurement location would cause the self-driving vehicle to exceed a mission completion time determined based on the mission priority;

in response to determining the modified path would not cause the self-driving vehicle to exceed the mission completion time, modifying the path to include the at least one preferred measurement location as an intermediate location;

moving the self-driving vehicle along the modified path to the destination location based on autonomous navigation;

during operation of the self-driving vehicle along the modified path, using a WiFi receiver of the self-driving vehicle to obtain a plurality of signal strength indications associated respectively with a plurality of measurement locations, wherein the plurality of measurement locations comprises the at least one preferred measurement location when the self-driving vehicle is in proximity of the at least one preferred measurement location; and storing an updated WiFi heat map based on the current WiFi heat map, the plurality of signal strength indications, and their associated plurality of measurement locations.

12. The method of claim 11, wherein the at least one preferred measurement location is determined based on the current WiFi heat map and the destination location.

13. The method of claim 11, wherein the current WiFi heat map comprises values associated with locations in the facility, and storing the updated WiFi heat map.

14. A method for determining environmental characteristics in a facility with one or more self-driving vehicles, the method comprising:

receiving a mission data from a fleet-management system, the mission comprising a destination location and a mission priority;

determining a path to the destination location;

determining at least one preferred measurement location, wherein the at least one preferred measurement location comprises a location associated with at least one of a number of data points below a minimum data point threshold and data points associated with a measurement date that is older than a minimum measurement frequency threshold;

determining whether modifying the path to include the at least one preferred measurement location would cause the self-driving vehicle to exceed a mission completion time determined based on the mission priority;

in response to determining the modified path would not cause the self-driving vehicle to exceed the mission completion time, modifying the path to include the at least one preferred measurement location as an intermediate location;

moving the self-driving vehicle along the modified path to the destination location based on autonomous navigation;

during the operation of the self-driving vehicle along the modified path, using at least one sensor of the self-driving vehicle to obtain a measurement of at least one environmental characteristic when the self-driving vehicle is in proximity of the at least one preferred measurement location; and storing the measurement in association with the at least one preferred measurement location.

15. The method of claim 14, further comprising:
receiving a second mission comprising a second destination location from a fleet-management system;
moving the self-driving vehicle to the second destination location based on autonomous navigation;
when the self-driving vehicle is in proximity of the at least one preferred measurement location, using the at least one sensor of the self-driving vehicle to obtain a second measurement of the at least one environmental characteristic;
replacing the stored first measurement with the second measurement in association with the at least one preferred measurement location.

16. The method of claim 15, wherein:
the at least one sensor is a WiFi receiver;
the at least one environmental characteristic comprises a first WiFi signal from a first WiFi access point; and
the measurement is a first signal strength measurement of the first WiFi signal and the second measurement is a second signal strength measurement of the first WiFi signal.

17. The method of claim 14, further comprising:
using the at least one sensor of the self-driving vehicle to obtain a second measurement of the at least one environmental characteristic when the self-driving vehicle is remote to the at least one preferred measurement location;
determining a measurement location of the self-driving vehicle associated with a location of the self-driving vehicle when the second measurement of the at least one environmental characteristic is obtained; and
storing the second measurement in association with the measurement location.

18. The method of claim 14, wherein the at least one environmental characteristic comprises a first environmental characteristic and a second environmental characteristic.

19. The method of claim 18, wherein:
the at least one sensor is a WiFi receiver;
the first environmental characteristic is a first WiFi signal from a first WiFi access point, and the second environmental characteristic is a second WiFi signal from a second WiFi access point; and
the first measurement is a first signal strength measurement of the first WiFi signal and the second measurement is a second signal strength measurement of the second WiFi signal.

20. The method of claim 19, wherein
the WiFi receiver is connected to the first WiFi access point and the WiFi receiver is not connected to the second WiFi access point; and
using the WiFi receiver to obtain the second measurement comprises performing a background scan on the second WiFi access point.

* * * * *